Patented Sept. 25, 1928.

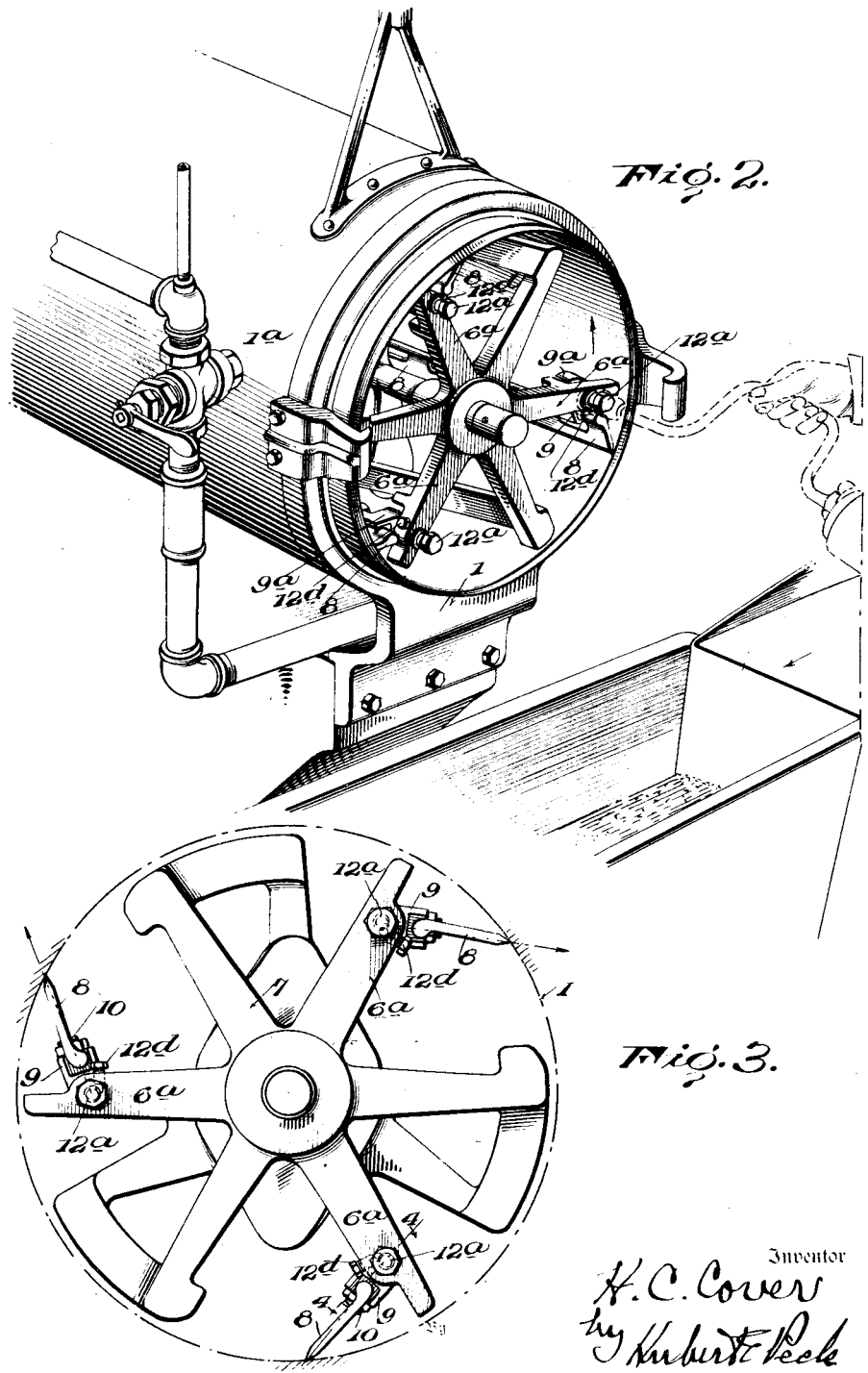

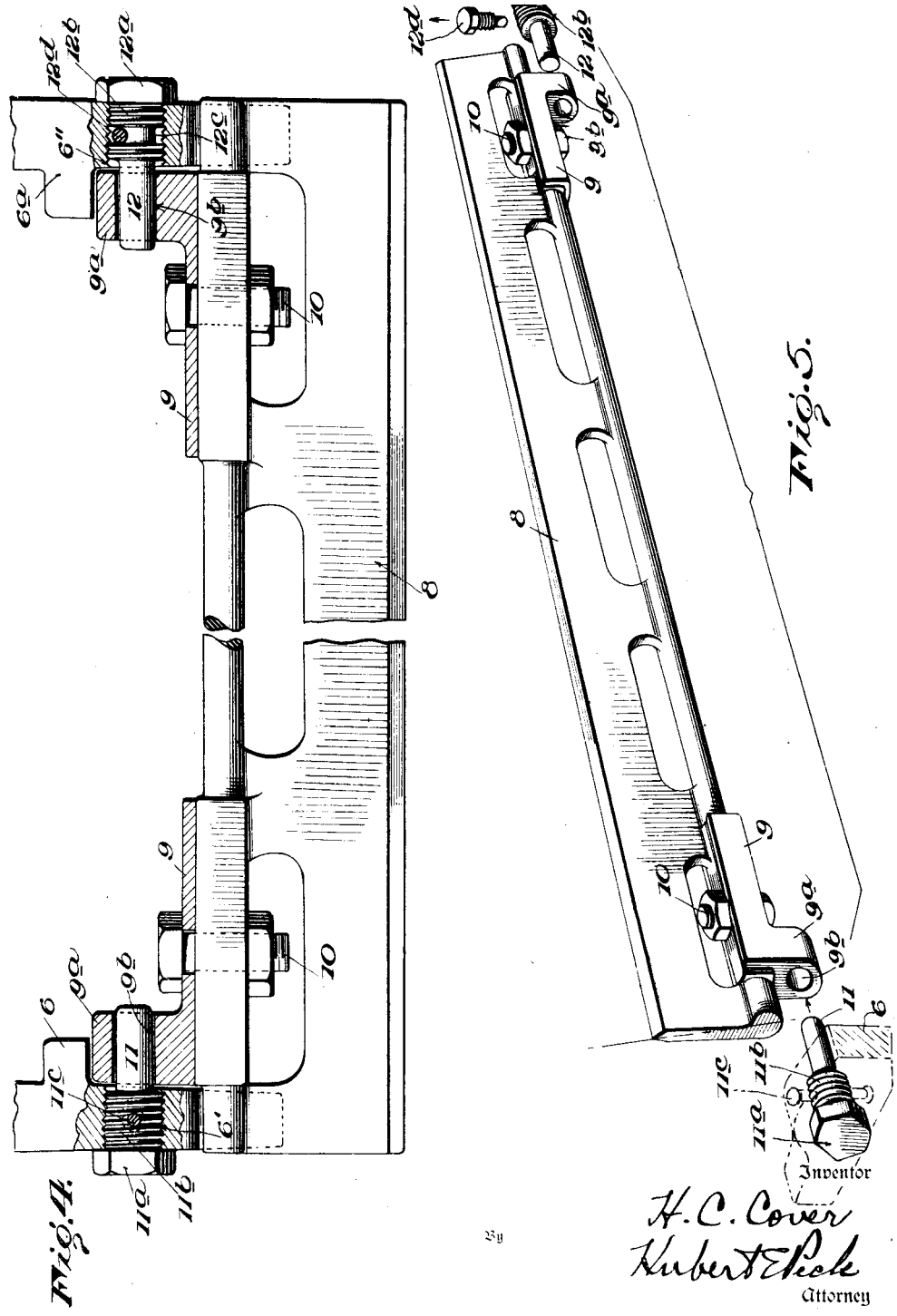

1,685,189

UNITED STATES PATENT OFFICE.

HARRY C. COVER, OF BALTIMORE, MARYLAND, ASSIGNOR OF ONE-HALF TO HIMSELF AND ONE-HALF TO MANUEL HENDLER, OF BALTIMORE, MARYLAND.

ICE-CREAM FREEZER.

Application filed October 3, 1927. Serial No. 223,707.

This invention involves improvements in and relating to large capacity or so-called commercial ice cream freezers; and the objects and nature of the invention will be readily understood by those skilled in the art in the light of the following description of the accompanying drawings that illustrate what I now believe to be the preferred mechanical expression or embodiment of my invention from among other forms, constructions and arrangements within the spirit and scope thereof.

In freezing ice cream in freezers of large capacity it is desirable from the standpoint of economy and rapid freezing, to prevent the accumulation of a layer of frozen product on the inner cylindrical surfaces of the freezer, and the quality of the frozen product is not up to the desired high standard where a frozen film or layer accumulates on the inner surface of the freezer because the removal thereof results in the presence of hard frozen particles in the ice cream product and such product is not hence of the desired smoothness.

I have discovered that these difficulties arise because of the improper action of the scrapers that are included in the rotating dasher and agitator assembly located in the freezer. If the scrapers become dull or deformed from their required true straight edge form, they permit the accumulation of a frozen layer or film on the cylinder walls and then as this film builds up the scrapers scrape or break this film from the cylinder walls and in this manner large ice crystals are incorporated in the finished product.

The commercial ice cream freezers in general use that I am familiar with embody rotary dasher and agitator assemblies that include pivoted scraper blades, but these blades are so mounted in the rotary assembly as to prevent the independent removal of the blades from the assembly while in the freezer. The consequence is that in order to sharpen these blades it has been necessary to remove the entire rotary dasher assembly from the freezer which is a time consuming and difficult operation and to then sharpen the scraper blades while remaining in the assembly by the use of files. This filing operation is a slow and tedious process and can be accurately performed only by skilled labor which is as a rule not present in an ice cream plant.

It is the purpose of my invention to avoid these difficulties and to provide a rotary dasher assembly for an ice cream freezer wherein the scraper blades are so mounted as to be readily removable from the assembly and from the ice cream freezer through the front end thereof after the removal of the front head from the freezer, without otherwise disturbing the rotary dasher assembly or removing it from the freezer.

A further object of the invention is to provide certain novel features of construction and arrangements of parts, with the end in view of producing an improved scraper blade mounting in an ice cream freezer rotary dasher assembly.

With the foregoing and other objects in view my invention consists in certain novel features and in constructions, and arrangements and combinations as more fully and particularly set forth and specified hereinafter.

Referring to the accompanying drawings, forming a part hereof.

Fig. 2 is a perspective view showing a portion of the freezer of Fig. 1 with its end head removed to disclose the front end portion of the rotary dasher assembly therein, dotted lines indicating a wrench applied to the assembly in the operation of releasing a scraper for removal through the front ends of the dasher assembly and freezer.

Fig. 3 shows the rotary dasher assembly of my invention in front end elevation, the cylindrical inner surface of the freezer being indicated in end elevation.

Fig. 4 is a detailed section elevation taken in the plan of the line 4—4, Fig. 3.

Fig. 5 is a detailed perspective view of one of the scraper blades, its end mountings being shown separated from the blades.

Figure 1:
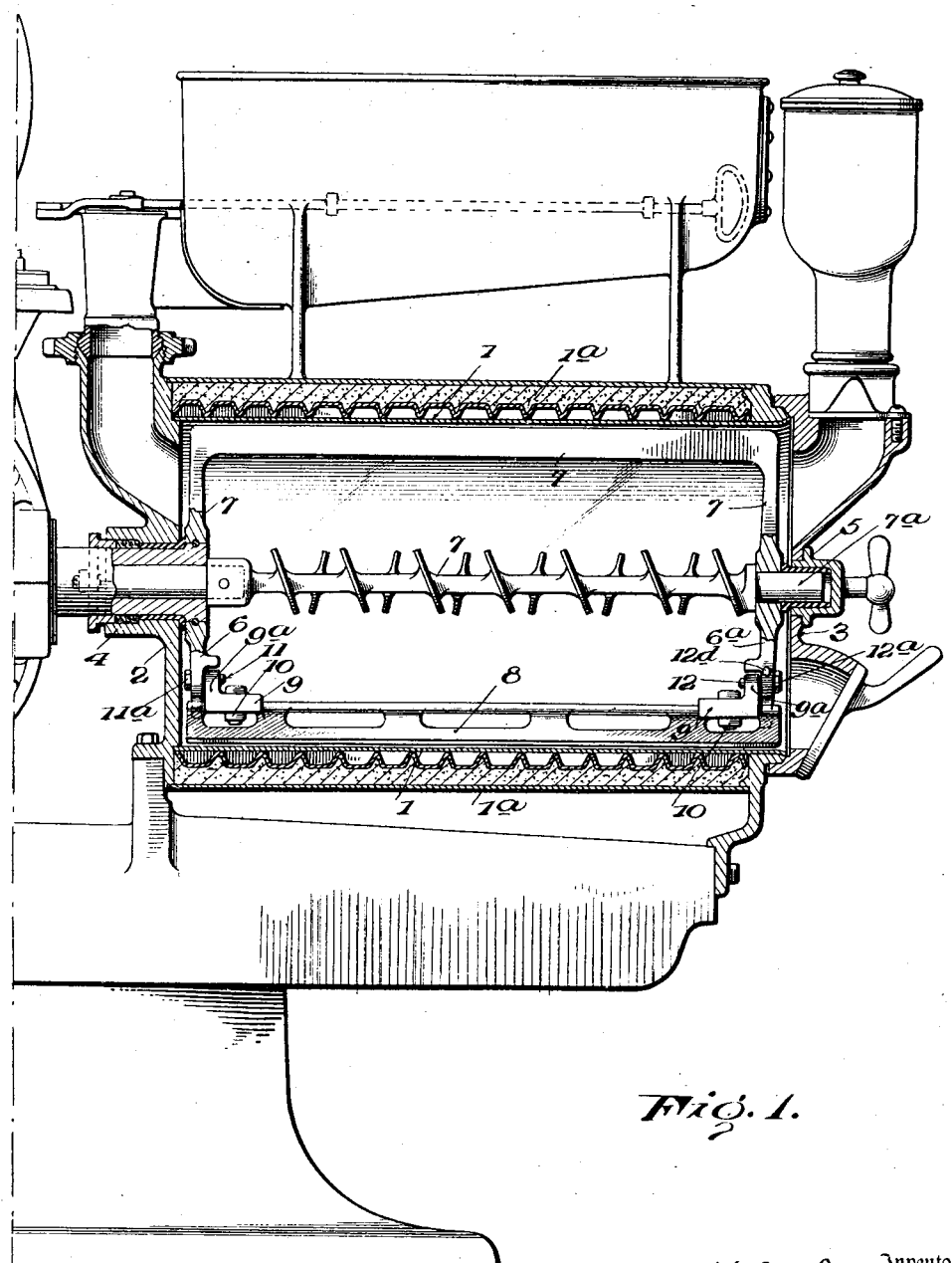
Fig. 1 shows a commercial ice cream freezer of any suitable or desirable construction in vertical longitudinal section, the rotary dasher assembly of this freezer including an embodiment of my invention.

The large capacity or so-called commercial ice cream freezer shown, embodies a cylindrical wall 1, forming the interior longitudinal cylindrical surface of the freezer and this wall 1, is enclosed in an exterior refrigerating and insulating jacket 1ª. The rear end of the cylinder 1, is closed by the rear end head 2, and the front end of the cylinder is closed by the removable front end head 3.

A rotary dasher and agitator assembly generally indicated by the reference numerals 7, is arranged in the cylinder 1, and is driven by suitable actuating means not shown usually arranged to the rear of the end head 2, which end head is provided with a bearing opening 4, in which the main supporting and driving shaft of the rotary assembly is mounted and through which it extends. At its front end this rotary dasher assembly is provided with a forwardly extending stub journal 7ª, removably mounted in the center bearing 5, of the removable front head 3, so that when the front head 3, is removed the bearing 5, will slip forward from the journal 7ª, and the dasher assembly will then be supported by the rear end head 2.

This rotary dasher assembly embodies end spider frames that include one or more radial arms 6, 6ª, that carry the scraper blades 8.

In the particular example here illustrated each scraper blade, consists of a long flat, usually brass, blade 8, in length approximately equal to the length of the freezer cylinder wall 1, and this blade has a beveled scraping edge extending throughout the length of the blade to travel in scraping engagement with the inner surface of the cylinder wall 1. This beveled edge should be always parallel with the cylinder wall and in scraping contact therewith throughout its length.

Each scraper blade extends between, is carried by, and is pivotally hung from a pair of the radial arms 6, 6ª, to perform the desired scraping functions, as will be well understood by those skilled in the art.

In this example, end clips 9, of a channel form receive or are fitted on the longitudinal back edge of the scraper blade and are secured thereto in any suitable manner, as by bolts 10. Each clip 9, is formed with a projecting ear 9ª, and each ear is formed with a bearing bore 9ᵇ, whose longitudinal axis is parallel with the scraping edge of the blade and consequently with the axis of rotation of the rotary dasher assembly. The bores 9ᵇ, of the two ears 9ª, located at the opposite ends of the back of the scraper blade 8, are alined.

The scraper blade is pivotally hung from the two end spider arms 6, 6ª, that support the blade, through the medium of a longitudinally arranged rear pintle 11, loosely entering the bore 9ᵇ, at the rear end of the blade, and a pintle 12, longitudinally alined with the pintle 11, and entering the bore 9ᵇ, at the front end of the blade. The pintle 11, is carried by the rear spider arm 6, and the pintle 12, is carried by the front spider arm 6ª.

The rear spider arm 6, is formed with a threaded or tapped hole 6', extending transversely therethrough, and a threaded stud 11ᵇ, having a rear wrench receiving head 11ª, is inserted through the tapped hole 6', from the rear and screwed therein until its head 11ª, fits the rear face of the arm 6. The end portion of this screw 11ᵇ is of reduced cylindrical form to form the pintle or stud journal 11, that projects forwardly from the front face of the spider arm 6, and forms the support for the rear end of the scraper 8. The cylindrical pintle 11, is of reduced exterior diameter with respect to the interior diameter of the bearing bore 9ᵇ, so that the ear 9ª, has a limited rocking movement on said pintle when the blade 8, is rocked or tilted from its front end, as hereinafter set forth.

The rear pintle 11, is preferably fixed with respect to its spider supporting arm 6, and this is usually accomplished by inserting a pin 11ᶜ, transversely through the arm 6, and diametrically through the threaded portion 11ᵇ, of the screw carrying the pintle 11.

The front end scraper blade supporting pintle 12, is removable, from the front side of the front end spider of the rotary dasher assembly.

For instance, the front end spider arms 6ª, have tapped or interior screw-threaded holes 6'', extending therethrough and alined, respectively, with the rear pintles 11. Screws 12ᵇ, having front end wrench receiving heads 12ª, are removably screwed into the holes 6'', until the screw heads 12ª, fit the front sides of the spider arm 6ª. These screws 12ᵇ, have their inner ends of cylindrical formation and of reduced diameter to form the pintles 12. Each screw 12ᵇ, is preferably formed with an annular groove 12ᶜ, that removably receives the inner end of removable locking screw 12ᵈ, extending into the arm 6ª, and accessible from the front of the end spider that includes the arm 6ª. These screws 12ᵈ, are provided as a precaution against unscrewing or loosening of the pintle carrying screws 12ᵇ, during the operation of the freezer.

It will be noted that the heads 12ª, of the pintle carrying screws 12ᵇ, are exposed and accessible at the front side of the front end spider of the rotary dasher assembly, when the front head of the freezer is removed. It will also be noted that the arms of the front end spider are spaced apart so that openings exist through which the scraper blades can be endwise inserted and removed from the dasher assembly while that assembly remains in normal position within the freezer.

As shown by Fig. 2 of the drawings, any one or all of the scraper blades 8, can be removed from the freezer and from the dasher assembly in the freezer by unscrewing and removing one or all of the front screws that carry the front pintles 12. When one of these front pintle carrying screws 12ᵇ, is unscrewed and removed from its arm 6ª, the scraper blade that is supported at the front end by the pintle of such screw can then be removed forwardly and endwise by the hand by tilting the same until its front ear 9ª, clears its front supporting arm 6ª, and by then pulling the blade endwise and longitudinally from the freezer through the open front end of the freezer.

Each scraper blade can be thus easily and quickly removed, and as easily and quickly applied.

The scraper blades when thus removed can be easily and quickly sharpened by the use of an appropriate grinding machine.

The pintles 11, that carry the rear ends of the scrapers, are fixed to and project forwardly from the radial arms 6, of the rear spider frame of the rotary dasher assembly supported in the freezer by the rear mounting in the rear end head of the freezer. The front end spider that embodies spaced arms 6ª, of the dasher assembly is also supported by said rear end mounting, particularly when the front end head of the freezer is removed.

The pintles 12, that support the front ends of the scrapers, project rearwardly from the front arms 6ª, in longitudinal alinement, respectively, with their cooperating or complementary rear pintles 11. These front pintles 12, while normally locked in fixed position in their arms 6ª, are, nevertheless, rendered separately longitudinally removable from the front scraper ears and from the arms 6ª, and likewise can be separately applied to operative position in the arms 6ª, all at and through the open front end of the freezer, while the rotary dasher assembly remains in its normal supported position within the freezer.

The scrapers can be longitudinally removed from the assembly in the freezer, and can be likewise inserted longitudinally into said assembly through the openings in the front spider frame of the assembly in the freezer, when the front end head of the freezer is opened or removed, and said openings in the front spider frame of the assembly while in the freezer, afford hand holes through which a scraper can be held tilted and manipulated after its front pintle 12, has been removed during the operation of slipping the scraper forwardly in a tilted position to slide its rear ear from the rear pintle 11, and carry the scraper forwardly clear of the assembly and freezer, and through which the scraper can be longitudinally inserted into the assembly to slip its rear ear onto its fixed pintle 11, and then rock the scraper to bring the bore of its front ear into alinement with the tapped screw hole in the front spider arm 6ª, to receive the front pintle 12, inserted rearwardly through said hole.

The loose fit of the rear ears of the scrapers on the fixed rear pintles 11, permits the removal and insertion of the scrapers when tilted or inclined to clear their front supporting arms 6ª.

Various modifications, departures and variations can be resorted to without departing from the spirit and scope of my invention, and hence I do not desire to limit my invention to the approximately exact disclosure hereof.

What I claim is:—

1. An ice cream freezer and the like, comprising a cylinder having end heads, at least one of said heads being movable to open said cylinder at one end, a rotary dasher assembly longitudinally arranged and supported within said cylinder, said assembly including a longitudinal scraper to travel with said rotary assembly in scraping engagement with the inner surface of said cylinder, said scraper being pivotally mounted in and carried by said assembly, and means whereby said scraper is rendered longitudinally removable from and applicable to said assembly through the open end of the freezer that is normally closed by said movable head, while said assembly remains in supported position in the head.

2. An ice cream freezer and the like; comprising a cylinder normally closed at the ends and provided with means for opening the cylinder at its front end; a rotary dasher assembly supported by and rotatory within the freezer and having transverse hand holes through its front end, said assembly including longitudinal pivotally hung scrapers accessible, removable and insertable through said front hand holes when the front end of the freezer is open, and means accessible and operatively at the front of said assembly when the freezer front end is open to release said scrapers for removal and whereby said scrapers can be normally fixed in pivotal operative positions in and supported by the assembly.

3. An ice cream freezer and the like, comprising a cylinder having a rear head and a movable front head; and a rotary dasher assembly longitudinally arranged in the cylinder and having a rear mounting extending through the rear head, said assembly embodying end supporting heads, the front supporting head having transverse openings therethrough, and longitudinal scrapers pivotally hung in said assembly heads, each scraper having end alined bearing bores, the rear supporting head having forwardly projecting pintles loosely and removably receiving the rear end bearing bores of the scrapers, respectively, and the front supporting head having front rearwardly projecting pintles removably entering the front bearing bores of the scrapers, respectively; said front pintles being forwardly removable from and applicable to said front supporting head when the front end of the cylinder is open, said scrapers being forwardly removable and rearwardly applicable, through said front supporting head when said front pintles are removed, while said assembly remains in its normal operative position within the cylinder.

4. In an ice cream freezer and the like, a rotary dasher assembly comprising opposite end rotary supporting heads; the rear head having a longitudinal forwardly projecting normally-fixed pintle, the opposite head having a longitudinal rearwardly projecting pintle normally secured in stationary position in said head and having means exposed at the front side thereof whereby said pintle can be withdrawn forwardly and removed from said head; and a removable scraper pivotally hung from and arranged between said heads and having end ears with bearing bores removably receiving said pintles.

5. In an ice cream freezer normally closed at both ends and capable of being opened at one end; a rotary dasher assembly arranged to rotate within the freezer, and embodying opposite end rotary supporting heads, scrapers pivotally hung in said assembly between said heads and separately removable longitudinally therefrom and applicable thereto through the front head, the front head having arms with intervening transverse openings, the scrapers at their rear ends being removably pivotally hung to the rear head and at their front ends having longitudinal bearing bores, and screws longitudinally applicable to and removable from tapped holes through said arms, each removable screw having a head at the outer side of its arm, the inner end of the screw projecting inwardly from its arm and forming a pintle removably entering the front bearing bore of its scraper.

6. In an ice cream freezer and the like; a rotary dasher assembly embodying a rear rotary supporting head having forwardly projecting fixed rear pintles, a front rotary supporting head having transverse hand holes and rearwardly projecting front pintles alined with said rear pintles, respectively, and scrapers longitudinally arranged between said heads and removably and pivotally hung in said assembly through the medium of said front and rear pintles, said front pintles being separately removable from and applicable to said front head, whereby said scrapers are separately removable longitudinally from and applicable to said assembly from the front through said hand holes.

Signed at the city of Baltimore, State of Maryland, this 1st day of October, 1927.

HARRY C. COVER.